US007440600B2

(12) United States Patent
Menhardt et al.

(10) Patent No.: US 7,440,600 B2
(45) Date of Patent: Oct. 21, 2008

(54) SYSTEM AND METHOD FOR ASSIGNING MAMMOGRAPHIC VIEW AND LATERALITY TO INDIVIDUAL IMAGES IN GROUPS OF DIGITIZED MAMMOGRAMS

(75) Inventors: Wido Menhardt, Los Gatos, CA (US); Ram Balasubramanian, Palo Alto, CA (US)

(73) Assignee: Carestream Health, Inc., Rochester, NY (US)

( * ) Notice: Subject to any disclaimer, the term of this patent is extended or adjusted under 35 U.S.C. 154(b) by 837 days.

(21) Appl. No.: 10/830,643

(22) Filed: Apr. 23, 2004

(65) Prior Publication Data
US 2004/0234125 A1 Nov. 25, 2004

Related U.S. Application Data

(60) Provisional application No. 60/464,966, filed on Apr. 23, 2003.

(51) Int. Cl.
*G06K 9/00* (2006.01)
(52) U.S. Cl. .................................................... 382/128

(58) Field of Classification Search ................. 382/128, 382/132
See application file for complete search history.

(56) References Cited

U.S. PATENT DOCUMENTS

| 5,748,173 | A | 5/1998 | Gur |
| 5,917,929 | A | 6/1999 | Marshall et al. |
| 7,146,031 | B1 * | 12/2006 | Hartman et al. ............. 382/132 |

FOREIGN PATENT DOCUMENTS

WO    WO 02/45437    6/2002

\* cited by examiner

*Primary Examiner*—Tom Y Lu

(57) ABSTRACT

A method for identifying a type of a mammographic view for a digital mammography image. The method comprises the steps of: identifying two or more candidate view types; identifying at least one feature capable of distinguishing between the two or more candidate view types; determining the feature for the digital mammography image; and corresponding the determined feature of the digital mammography image with one of the two or more candidate view types to identify the type of a mammographic view of the digital mammography image in accordance with the correspondence.

17 Claims, 3 Drawing Sheets

FEATURE INPUTS

TABLE 1

| IMAGE/VIEW | RCC | LCC | RMLO | LMLO |
|---|---|---|---|---|
| 1 | .6 | .3 | .6 | .3 |
| 2 | .2 | .7 | .1 | .8 |
| 3 | .7 | .1 | .4 | .1 |
| 4 | .1 | .5 | .1 | .4 |

TABLE 2

| STEP 1 | RCC | LCC | RMLO | LMLO | |
|---|---|---|---|---|---|
| IMAGE 1 | .6 | .3 | .6 | .3 | |
| IMAGE 2 | .2 | .7 | .1 | (.8) | LMLO |
| 3 | .7 | .1 | .4 | .1 | |
| 4 | .1 | .5 | .1 | .4 | |

TABLE 3

| STEP 2 | RCC | LCC | RMLO | LMLO | |
|---|---|---|---|---|---|
| 1 | .6 | .3 | .6 | .3 | |
| 2 | .2 | .7 | .1 | (.8) | LMLO |
| IMAGE 3 | (.7) | .1 | .4 | .1 | RCC |
| 4 | .1 | .5 | .1 | .4 | |

TABLE 4

| STEP 3 | RCC | LCC | RMLO | LMLO | |
|---|---|---|---|---|---|
| IMAGE 1 | .6 | .3 | (.6) | .3 | RMLO |
| 2 | .2 | .7 | .1 | (.8) | LMLO |
| 3 | (.7) | .1 | .4 | .1 | RCC |
| 4 | .1 | .5 | .1 | .4 | |

TABLE 5

| STEP 4 | RCC | LCC | RMLO | LMLO | |
|---|---|---|---|---|---|
| IMAGE 1 | (.6) | .3 | (.6) | .3 | RMLO |
| 2 | .2 | .7 | .1 | (.8) | LMLO |
| 3 | .7 | .1 | .4 | .1 | RCC |
| IMAGE 4 | .1 | (.5) | .1 | .4 | LCC |

*FIG. 4*

SYSTEM AND METHOD FOR ASSIGNING
MAMMOGRAPHIC VIEW AND LATERALITY
TO INDIVIDUAL IMAGES IN GROUPS OF
DIGITIZED MAMMOGRAMS

CROSS REFERENCE TO RELATED APPLICATIONS

This is a 111A application of U.S. Provisional Application Ser. No. 60/464,966, filed on Apr. 23, 2003, incorporated herein by reference.

FIELD OF THE INVENTION

This invention relates generally to computer aided detection (CAD) of abnormalities in medical images and, more particularly, to a system and method for assigning mammographic view and laterality to individual images in groups of digitized mammograms.

BACKGROUND OF THE INVENTION

Screening mammography is an established method for detecting early signs of breast cancer in otherwise asymptomatic women. The American College of Radiology recommends annual mammography for women over forty. Women undergo an X-ray exam in which X-ray films of the breast are exposed and then developed for later review. A radiologist reads the films and assesses the likelihood of the presence of signs of breast cancer for the case. If a suspicious finding is present, the woman will typically be invited for additional, more detailed diagnostic X-ray exams, followed by ultrasonic exams, and finally, biopsy.

In a typical screening exam in the United States of America, four X-rays of a women's breast are obtained. Two mammographic views are obtained for each breast: a craniocaudal view is obtained by positioning the X-ray film horizontally under the compressed breast, and a medio-lateral oblique view is obtained by positioning the X-ray film in a plane that is approximately orthogonal to the left-right axis. In some situations, more or fewer X-ray views may be obtained. For example, women with large breasts, implants, or unilateral mastectomies may have more or fewer X-ray films to cover all breast tissue.

As shown in FIG. 1, the four views are typically labeled LCC (Left Cranio-Caudal), RCC (Right Cranio-Caudal), LMLO (Left Medio-Lateral Oblique) and RMLO (Right Medio-Lateral Oblique). Knowledge of the laterality (i.e., Left/Right) and type of mammographic view (i.e., CC or MLO) is critical for the review process. Within each pair, the left image corresponds to the right laterality of the patient, and the right image corresponds to the left laterality of the patient.

Each mammography site, and often each individual radiologist, has established procedures and preferences for the positioning of the four views/films with respect to each other on the light box. For example, the LCC and RCC views may be positioned next to each other, with the chest wall on both views in close proximity of each other, and the LMLO and RMLO views may be positioned underneath. Similarly, the LCC-RCC and LMLO-RMLO pairs may be positioned beside each other. In addition, prior exams (that is, previous years) of the same woman might also be positioned on the same light box for simultaneous review and comparison in well-defined positions with respect to each other and the current mammographic films.

Radiologists follow a well-established and repeatable routine in reviewing mammograms, with and without a magnifying glass, which is why a repeatable positioning of the films on the light box is important and indispensable.

The diagnosis procedure often involves the use of Computer-assisted detection (CAD) which is part of a method to increase the sensitivity of the mammographic screening process. After the X-ray films have been developed, but before they have been reviewed by a radiologist, they are digitized by a high-resolution digitizer. The digitized images are then processed by an algorithm server using computer-aided detection algorithms to automatically identify regions that may be consistent with signs of breast cancer. When the radiologist reviews the films, and after she/he has arrived at a diagnosis, a computer screen or printout is used to present the results of the algorithmic detection process to the radiologist in the form of marks on the mammographic images. The radiologist can use some of these marks to re-review the mammographic films, and in a some instances, change his/her opinion/diagnosis. In this manner, the computer algorithms in a CAD system can serve as a "second reader" to help increase the sensitivity of the mammographic review process.

The computer algorithms typically accept the four views of a screening mammography exam as a group. Although it is possible for the algorithms to process each of the digitized images without knowledge about their laterality or the type of mammographic view, the performance of the algorithms might improve if this knowledge is available to the algorithms, i.e. if the laterality and type of mammographic view is assigned to each digitized image.

The marks for suspicious regions can be placed on a reduced version of the digitized mammographic film. If so, it is advantageous if the reduced version of the digitized mammographic films on which the marks for suspicious regions are presented to the radiologist are arranged in exactly the same way as their film counterparts are arranged on the light box. In this manner, the radiologist can readily navigate between the films, the digitized versions, and the CAD marks to quickly re-review regions on the film that had been flagged by the CAD algorithms as being suspicious.

However, the assignment of laterality or type of mammographic view is not encoded in the mammographic films in computer-readable form. As a result, typical CAD systems require that the four views be fed into the digitizer in a pre-defined order, and in a pre-defined orientation. The pre-ordering and pre-orientation process is laborious, time-consuming, and error-prone.

U.S. patent application Ser. No. 09/721,347, incorporated herein by reference, describes a method wherein lead markers identifying the laterality and type of mammographic view are typically positioned on the X-ray film prior to exposure of the breast and the film to X-ray. These markers appear as text (for example, "RCC") on the films, and therefore could be recognized by a form of template matching. However, template matching algorithms require the use of unique and well-characterized lead markers.

U.S. Pat. No. 5,748,173 discloses methods that allow correlation of films on a light box with digitized images in a computer database based on identification information encoded in the film on the light box. The identification methods include magnetic encoding, barcodes or character recognition on CCD camera images of patient information printed on the film. However, this method suffers from the complexity of affixing magnetic or bar code information on the film, or from the complexity of positioning one or more CCD cameras such that they will reliably image patient information from the films on a light box, and from the complexity of character recognition and text understanding based on such images obtained with CCD cameras.

In a commercially available system from icad, Inc. (Nashua, N.H.), a barcode label with patient identification, laterality and type of mammographic view is affixed to each film prior to digitization and CAD processing. As each film is digitized, a barcode reader obtains laterality and type of mammographic view from the barcode label, and assigns this to the digitized image. During the reading process, each film on the light box is correlated with its digitized counterpart using a barcode reader as described in U.S. Pat. No. 5,748,173. A drawback of this method lies in the need to affix a special barcode label to each film, a laborious process comparable to ordering and orienting films prior to digitization.

Therefore, a need exists to overcome the drawbacks and disadvantages of existing and known systems. More particularly, there exists a need for alternative methods to those described in the prior art for assigning laterality and type of mammographic view to digitized images of X-ray film mammograms.

SUMMARY OF THE INVENTION

An object of the present invention is to provide a system and method for assigning laterality and type of mammographic view to digitized images of X-ray film mammograms.

Another object of the present invention is to provide such a system and method for assigning mammographic view and laterality to individual images in groups of digitized mammograms.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

In one embodiment of the invention, there is provided a method for automatically assigning a type of a mammographic view to a digitized mammography X-ray image which comprises providing two or more possible types, calculating, for said digitized image, one or more features capable of distinguishing between the two or more types and correlating the one or more calculated features of the digitized image with one of the types thereby assigning a type to the digitized image.

In a further embodiment, the method comprises determining, for the digitized image, a classification coefficient corresponding to each of the possible types by, for example, assigning the calculated features to a pre-determined node of a neural network, using the neural network to calculate the classification coefficient corresponding to each of the possible types and using the classification coefficients to assign the type to the one or more image.

In yet a further embodiment of the invention, each of the digitized images in a group of images is assigned a different type of mammographic view and this assignment is optimized.

According to one aspect of the present invention, there is provided a method for identifying a type of a mammographic view for a digital mammography image. The method comprises the steps of: identifying two or more candidate view types; identifying at least one feature capable of distinguishing between the two or more candidate view types; determining the feature for the digital mammography image; and corresponding the determined feature of the digital mammography image with one of the two or more candidate view types to identify the type of a mammographic view of the digital mammography image in accordance with the correspondence.

According to another aspect of the present invention, there is provided a method for automatically assigning a type of a mammographic view for a digital mammography image. The method comprises the steps of: identifying two or more candidate view types; determining at least one feature for the digital image, the at least one feature being distinguishable between the two or more candidate view types; correlating the determined feature of the digital image with one of the two or more candidate view types; and assigning the type of a mammographic view to the digital mammography image in accordance with the correlation.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 4 shows an illustration of an iterative optimization technique for four images in accordance with the present invention.

DETAILED DESCRIPTION OF THE INVENTION

Figure 1:
FIG. 1 shows an exemplary group of four digitized X-ray images of a screening mammography case.

The following is a detailed description of the preferred embodiments of the invention, reference being made to the drawings in which the same reference numerals identify the same elements of structure in each of the several figures.

The present invention provides a method for automated assignment of laterality and type of mammographic view to digitized images of X-ray film mammograms. A feature of the method is that it does not rely on any prior knowledge of the type of information present in each of the four views of a screening mammography case, nor does it rely on the position or orientation of the breast in these four views, or on the position or orientation of any labels, markers or other information present in the images.

Instead, the method employs the automated calculation of global image features capable of (i.e., adapted to) providing a distinction between different mammographic views, thereby allowing the assignment of a mammographic view (laterality and type of view) to each image.

In the disclosure hereinafter, the laterality and type of a mammographic view will be referred to as a type of mammographic view. Thus, herein, unless otherwise indicated, "type" or "type of mammographic view" refers to both laterality and type.

In one embodiment, generally, one or more features are selected that will be used to determine a type of mammographic view. The selection of the feature(s) is preferably based on its predictive value with regards to determination of a type of mammographic view. A parameter for the feature is then calculated for a plurality of regions within the image and is assigned a classification coefficient of a type of mammographic view.

For example, if four types of mammographic views are possible, then an image can be assigned a classification coefficient corresponding to each type of mammographic view. The image is then assigned the type of mammographic view having the highest coefficient of predictability.

Figure 2:
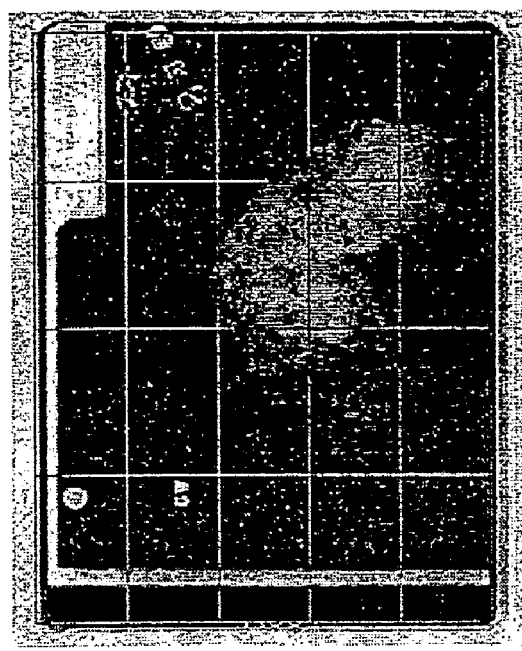
FIG. 2 shows an exemplary single digitized X-ray image wherein an grid overlay shows tiles that are used to calculate global features of the image, for example, 4×5=20 tiles are used.

Global Image Feature. In one embodiment of the invention, global image features are calculated over a grid laid over the image. Preferably, a small set of global image features are employed (for example, about twenty (20) global image features) and are calculated over a gross grid laid over the image. For example, as shown in FIG. 2, the grid may be comprised of 4×5 (i.e., 20 in total) mosaic tiles, but other grid sizes can also be used.

Brightness feature calculation. The global image feature can relate to brightness, for example, the average brightness of each title. The average brightness of a mosaic tile can be computed by dividing the sum of the pixel intensities of the digitized image within the mosaic tiles by the number of pixels within the mosaic tile.

Other features. In another embodiment of the invention, the global image feature can be the average contrast of a mosaic tile. The average contrast can be calculated by dividing the sum of the pixel intensities of a high-pass filtered version of the digitized image within a tile by the number of pixels within the mosaic tile. It will be evident to those skilled in the art that other types of features could be applied to this problem.

Multiple features. In yet another embodiment of the invention, multiple features may be calculated for each image tile, for example average brightness and average contrast in a preferred embodiment of the invention.

Normalization. Prior to further processing, the features may be normalized. In a preferred embodiment of the invention, the features are normalized by dividing each feature value for each tile by the average of that feature's value calculated over all the tiles of the image.

In another embodiment of the invention, each feature is normalized by dividing each feature value for each tile by the average of that feature's value calculated over all the tiles of all the images in the group of images from one patient.

Neural network classification. In another embodiment of the invention, classification coefficients can be obtained using a neural network (NN). Thus, once the image features have been calculated, a trained NN is presented with the features. Training of the NN is more particularly described below. The NN has an input node for each image region, for example twenty. The NN has four output nodes corresponding to the four possible types of mammographic views, which will be conveniently labeled "RCC", "LCC", "RMLO" and "LMLO". The NN may internally be configured in various ways that are known to those skilled in the art, but in a preferred embodiment of the invention, the NN has at least one hidden layer with a hidden node, for example, one hidden layer with ten hidden nodes. After the NN has been presented with the calculated image features parameters at the input nodes, and after internal NN calculations have been performed, the four output nodes will assume classification coefficient values between 0 and +1. The higher the value, the more likely it is that the present digitized image should be assigned the laterality and type of mammographic view encoded in that output node label, for example, "RCC". The NN will thus produce a likelihood between 0 and +1 for each of the four possible laterality and type of mammographic view combinations.

Figure 3:
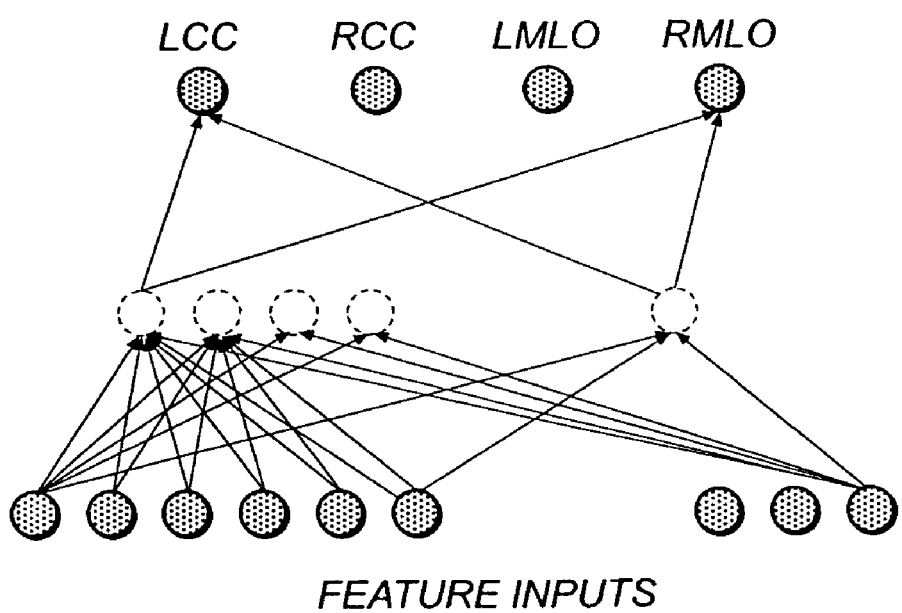
FIG. 3 shows a schematic diagram of a neural network (NN) with a set of input nodes (e.g., 2×20=40 nodes are used), a set of hidden nodes (e.g., 10 hidden nodes in one hidden layer are used), and a set of four output nodes, each corresponding to one mammographic view and laterality assignment.

Referring to FIG. 3, FIG. 3 shows diagram of a neural network (NN) with a set of input nodes (in one embodiment of the invention, 2×20=40 nodes are used), a set of hidden nodes (in one embodiment of the invention, 10 hidden nodes in one hidden layer are used), and a set of four output nodes, each corresponding to one mammographic view and laterality assignment. Only a few of the connections between the nodes are shown for illustration purposes.

Each digitized image in a screening mammographic digitized image group obtained from one case (e.g., one woman) is presented to the NN, and in this way four likelihood values for the four possible laterality and type of mammographic view combinations, RCC, LCC, RMLO, and LMLO are obtained for each of the four images, sixteen in all.

Interative Optimization. In one aspect, in the final stage of the method, individual assignments of images to a type of mammographic view are determined using the following iterative optimization algorithm.

In the first step, the maximum value of the NN output nodes from all four images is selected. This is considered the most likely assignment of all. The corresponding image and the corresponding laterality and type of mammographic view combination is eliminated from the remaining possible choices. For example, if the maximum value was "RCC" and this maximum value is associated with image "1", then image "1" is assigned an RCC view and all "RCC" nodes as well as the remaining nodes for image "1" are no longer considered.

Next, the maximum of the remaining nodes will be selected-this can no longer be a node for image "1" (because it was already assigned and thus eliminated), and it can no longer be "RCC" (because it was assigned to image "1") For example, if the maximum value among the remaining nodes was "LMLO" for image "3 ", then image "3" is assigned "LMLO", and the other "LMLO" nodes and image "3" nodes are eliminated whereby the only remaining nodes from images "2" and "4" are considered, and only the remaining nodes "LCC" and "RMLO".

Again, the maximum among the remaining nodes and thus the third assignment is selected, leaving only one possible assignment as the fourth assignment.

Global optimization. In a further aspect of the invention, a global optimization technique is used. Each of the four images is assigned to one of the four possible laterality and type of mammographic view combinations in such a way that the sum of the NN output nodes corresponding to these assignments is maximized.

In application, let the value of the NN output node corresponding to RCC for the first image be RCC(1), the value of the NN output node corresponding to LCC for the second image be LCC(2), and so forth.

The optimization process then becomes to maximize the equation:

$$RCC(i)+LCC(j)+RMLO(k)+LMLO(l)$$

wherein i,j,k and l represent unrepeated elements selected from the set of numbers {1,2,3,4}, i.e. none of i,j,k or l can be the same.

It will be evident to those skilled in the art what other optimization techniques, including linear programming, can be applied to this problem.

Neural network training. Neural networks can employ "weights" of the internal connections between input nodes, hidden nodes and output nodes. These weights can be determined during a training process wherein the input nodes and the output nodes are presented with "correct" combinations. The field of NN theory and training methods is well-established and well-described in the literature.

In the present invention, a training method could comprise selecting a representative set of screening mammography cases. For each of these digitized images of these mammography cases (four images each), the approximately forty features corresponding to the input nodes of the neural network are calculated. Furthermore, for each of the images, the correct assignment to a laterality and type of mammographic view is manually determined. For each case, and for each image, the forty features are presented to the NN, and simultaneously all output nodes are set to zero, except for the correct one, which is set to one.

At this point, the NN training process is started, and it is repeated for each image of all cases. The weights are updated by computing an error at the output node of the NN and filtering it back through the NN, updating each weight in the direction of the gradient of the error so as to reduce any error. This process, generally known as back propagation, has many variations that are well-established and well-described in the literature as so will not be described in detail herein. Those skilled in the art will recognized that methods of back propagation and NN training can be employed.

Other classifiers. As an alternative to a NN, other classifiers can be used. For example, in one other embodiment of the invention, the NN is replaced by a proximity measure in feature space.

First, the features for each training image of a specified type of mammographic view (for example, LCC) are averaged, to arrive at an average feature vector for each of the four types of mammographic view.

Next, the vector product of the average feature vector for each of these four combinations (LCC, RCC, LMLO, and RMLO) with the feature vector of each of the four digitized images of a group of X-rays for a patient is calculated. Each of these values is then equivalent to the four NN outputs calculated for each image in the group as described previously for an NN as the classifier.

Alternatively, the RMS (root mean square) difference between the average feature vector for each of the four types with the feature vector of each of the four digitized images can be calculated. This RMS difference is representative of a 'distance' in space of each image to the type and the minimum distance indicates which type the image most likely belongs to. As such, in the optimization processes described above, it is desired to minimize rather than maximize.

It will be evident to those skilled in the art what other types of classifiers could be used, and how their output will be substantially equivalent to NN outputs, and how these can then be used in the optimization techniques described above.

Standard orientations. In one embodiment of the present invention, the X-ray films are fed into the digitizer in any order, but in a pre-defined orientation. For example, the definition could be that the "shiny" side of the film is facing up for all images to be digitized, and that four images oriented in standard orientations (as shown in FIG. 1). The standard orientations could, for example, include the requirement that the pectoral muscle in MLO mammographic view images be at the top of the image, and that the chest wall for images of left laterality be on the viewer's left, and vice-versa for right laterality. In summary, in this embodiment of the invention, an RCC image (for example) will always be digitized in the same orientation.

Other orientations. In another embodiment of the invention, which is more particularly described below, these requirements are relaxed in various ways.

Other orientations (4 possible orientations). In another embodiment of the invention, the digitized X-ray images used as input to the method need not be presented in standard orientations, but can be presented arbitrary orientations, provided that all images are digitized with either emulsion side up, or emulsion side down (i.e. each image can be take on four possible orientations). In this embodiment, the images are first rotated into a portrait orientation if they were in landscape orientation, reducing the number of possible orientations to two.

Two methods are now described to enhance the method to accept input digitized images in two possible portrait orientations (i.e., top-up, and top-down).

In the first method, the NN is trained with each input image of the training set in the top-up position first, and immediately afterwards, with the same image in the top-down position. In both cases, the output nodes are presented with the same value. This means that the training set is doubled, simply be taking all input images and rotating them by 180 degrees. Thus, the NN output will be approximately the same for the same image if it is rotated by 180 degrees, and the same optimization techniques as described above can be applied.

In another method, the NN remains unchanged from the method with defined input orientations. Instead, the image under consideration for assignment of a type of mammographic view is presented to the NN twice, that is, once in the orientation it was digitized in, and once rotated by 180 degrees. One of these orientations will be top-up, and one will be top-down, but it is at this point not known, which. As a result, at the end of the NN classification process, each input image will have eight, not four, NN outputs, and thus two different likelihoods for each of the four possible types of mammographic view combinations (LCC, RCC, LMLO, and RMLO). In total, each group of images will have 32, not 16, NN output values.

Both optimization processes described above can be augmented to process these 32 output values. For ease of discussion, only the modifications to the global optimization process are described herein. For ease of discussion, let RCC(1, 0) describe the NN output node value labeled "RCC" for the first image in the group, and let RCC(1,180) describe the NN output node value for the first image in the group, rotated by 180 degrees. Similarly, LCC(3,180) would designate the NN output node value labeled "LCC" for the third image in the group, rotated by 180 degrees, etc., for all 32 NN output values. The global optimization problem now seeks to maximize the sum of the equation:

$$RCC(i,x)+LCC(j,y)+RMLO(k,z)+LMLO(l,t)$$

wherein i,j,k, and l are from the set $\{1,2,3,4\}$, with no two the same, and where x, y, z, and t are each either 0 or 180.

Other orientations (8 possible orientations). In yet another embodiment of the invention, the digitized X-ray images used as input to the method are not required to be presented in any preferred orientation, and can thus be digitized in any orientation, including emulsion side up or emulsion side down, resulting in eight possible orientations. Again, the number of possible orientations is divided in half by rotating the images into portrait orientation if necessary. This is possible because mammographic films are always rectangular, and never square.

The classification method (for example, a NN), and the optimization method (for example, global optimization) can be modified and augmented in substantially the same manner as described for other orientations with only four possibilities.

In the case of NN training, each training image would be presented to the NN four times for training (rotated by 180 degrees, but also mirrored). In the case of the global optimization process, optimization would include mirroring in addition to the rotation values, as will be evident to those skilled in the art.

Example of Iterative Optimization. FIG. 4 illustrates an iterative optimization technique for four images in accordance with the present invention. It is noted that the values in the tables are exemplary values for illustrative and demonstrative purposes only. The first table (Table 1) shows the values for each image, while the next four tables (Tables 2 through 5) illustrate the steps followed to generate a type for each image.

Table 1 displays the values for each image. In operation, a procedure is to select/choose a maximum value and then eliminate this type from the table. For this particular example, the maximum corresponds to 0.8 (located at row 2 and column 4, LMLO). Accordingly, as shown in Table 2, Image 2 is assigned type LMLO and the second row and fourth column are removed. Continuing the procedure, Table 3 is reviewed to determine the largest/maximum remaining value. This value is determined to be 0.7 (located at row 3, column 1, RCC). Therefore, Step 2 assigns Image 3 to type RCC. Referring to Table 4, Step 3 follows the same logic, that is, first removing row 3 (Image 3) and column 1 (RCC) and then selecting the largest/maximum remaining value (i.e., 0.6). This results (at Step 4; Table 5) in Image 1 being assigned type RMLO. Finally, there is only one value left, and so Image 4 is assigned type LCC.

Computer Program Product. A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for automatically assigning a type of a mammographic view for a digital mammography image, said method comprising the steps of:
    identifying two or more candidate view types;
    determining at least one feature for the digital image, the at least one feature being distinguishable between the two of more candidate view types;
    correlating the determined feature of the digital image with one of the two or more candidate view types by determining, for the digital mammography image, a classification coefficient corresponding to each of the two or more candidate view types; and
    assigning the type of a mammographic view to the digital mammography image in accordance with the correlation,
    wherein the step of determining the classification coefficient comprises the steps of:
        assigning the determined feature to a plurality of predetermined nodes of a neural network;
        calculating for the digital mammography image, using the neural network, the classification coefficient corresponding to each of the two or more candidate view types; and
        employing the calculated classification coefficients to assign the type of a mammographic view to the digital mammography image.

2. The method of claim 1, wherein the step of determining the classification coefficient is accomplished by a vectorial multiplication of an average of the determined feature of preselected images of a known type with the determined feature of the digital mammography image to generate a classification coefficient corresponding for each of the two or more candidate view types.

3. The method of claim 1, further comprising a step of optimization.

4. The method of claim 3, wherein the step of optimization comprises the steps of:
    a) comparing the classification coefficients corresponding to each of the two of more candidate views types for a first digital image to select the type with the highest classification coefficient;
    b) assigning said selected type to said first image; and
    c) repeating steps a) and b) for each image with the proviso that a given type, once assigned, is removed from said possible types.

5. The method of claim 3, wherein the step of optimization comprises the steps of:
    a) maximizing a sum of said classification coefficients of each type of all images; and
    b) assigning to each image the type associated with that image in the maximized sum.

6. The method of claim 3, wherein the step of optimization is accomplished by linear programing.

7. The method of claim 1, wherein said features are calculated from a plurality of predetermined regions in said digitized image.

8. The method of claim 7, wherein the feature is brightness, contrast, or a combination of brightness and contrast.

9. The method of claim 8, wherein said features are calculated from at least about 20 grid elements in said digitized image.

10. The method of claim 7, wherein the feature is brightness, contrast, or a combination of brightness and contrast.

11. The method of claim 10, wherein the feature is normalized relative to the plurality of predetermined regions.

12. The method of claim 1, wherein the digital mammography image is provided by digitizing X-ray film in any orientation.

13. The method of claim 1, wherein the digital mammography image is provided by digitizing X-ray film in a predetermined orientation.

14. The method of claim 13, wherein the predetermined orientation is selected from an orientation of emulsion side up and emulsion side down.

15. The method of claim 14, wherein the predetermined orientation is further selected from an orientation of portrait and landscape.

16. The method of claim 1, wherein the step of determining the classification coefficient is accomplished by calculating a RMS of a vector difference between an average of the determined feature of preselected images of a known type with the determined feature of the digital mammography image to generate a classification coefficient corresponding for each of the two or more candidate view types.

17. The method of claim 16, further comprising a step of optimization, wherein the step of optimization comprises the steps of:
    a) minimizing a sum of said classification coefficients of each type of all images; and
    b) assigning to each image the type associated with that image in the minimized sum.

* * * * *